US006450865B2

(12) United States Patent
Mulroy et al.

(10) Patent No.: US 6,450,865 B2
(45) Date of Patent: Sep. 17, 2002

(54) NON-CONTACT SUPPORT FOR CYLINDRICAL MACHINING

(75) Inventors: Grethel K. Mulroy, Pittsford, NY (US); Thomas L. DiGravio, Ontario, NY (US); Steven M. Sippel, Webster, NY (US)

(73) Assignee: Xerox Corporation, Stamford, CT (US)

( * ) Notice: Subject to any disclaimer, the term of this patent is extended or adjusted under 35 U.S.C. 154(b) by 51 days.

(21) Appl. No.: 09/850,426

(22) Filed: May 7, 2001

Related U.S. Application Data

(62) Division of application No. 09/146,207, filed on Sep. 2, 1998.

(51) Int. Cl.[7] ................................................. B24B 7/30
(52) U.S. Cl. ........................ 451/49; 451/178; 451/179; 451/209
(58) Field of Search ........................... 451/49, 178, 179, 451/209

(56) References Cited

U.S. PATENT DOCUMENTS

| 4,276,723 A | 7/1981 | Fournier | 51/238 S |
|---|---|---|---|
| 4,399,639 A | 8/1983 | Lessway | 51/238 S |
| 4,546,681 A | 10/1985 | Owsen | 82/38 R |
| 4,663,892 A | 5/1987 | Smith | 51/289 R |
| 4,709,509 A | 12/1987 | Yoneda et al. | 51/165.71 |
| 4,711,054 A | 12/1987 | Tsujiuchi et al. | 51/165.77 |
| 4,712,332 A | 12/1987 | Smith | 51/103 WH |
| 4,715,149 A | 12/1987 | Kelsey | 51/241 VS |
| 4,831,782 A | 5/1989 | Clough et al. | 51/48 R |
| 5,070,655 A | 12/1991 | Aggarwal | 51/165.71 |
| 5,076,022 A | 12/1991 | Ohta et al. | 51/165.71 |
| 5,285,599 A | 2/1994 | Lessway | 51/289 R |
| 5,441,438 A | 8/1995 | Bishop | 451/5 |
| 5,527,210 A | 6/1996 | Sharer | 451/408 |
| 5,547,414 A | 8/1996 | Ohmori | 451/21 |

*Primary Examiner*—Joseph J. Hail, III
*Assistant Examiner*—Willie Berry, Jr.
(74) *Attorney, Agent, or Firm*—Andrew D. Ryan

(57) ABSTRACT

A support for supporting a work piece to be machined is provided. The support is for use in a machine adapted to receive fluid from a fluid source. The machine includes a tool for removing material from the work piece. The support includes a body defining a chamber therein and an inlet operably associated with said body. The inlet is in communication with the chamber. The inlet is adapted for communication with the fluid source. The support also includes an outlet operably associated with the body and in communication with the chamber. The outlet is adapted to provide a stream of fluid for supporting the work piece.

3 Claims, 7 Drawing Sheets

NON-CONTACT SUPPORT FOR CYLINDRICAL MACHINING

Cross-reference is made to the following divisional application filed concurrently herewith: U.S. application Ser. No. 09/146,207, filed Sep. 2, 1998, entitled "Grinding Wheel With Geometrical Pattern", by Timothy R. Jaskowiak et al.

The present invention relates to machining of cylindrical parts. More specifically, the invention relates to a process and apparatus for machining long slender shafts.

Components for machines and mechanical apparatuses are typically machined to obtain precision tolerances and accurate surface conditions. Machining of the precision surfaces are typically machined by presenting a cutting tool or a grinding wheel against the precision surface.

During machining common precision parts include cylindrical parts. Cylindrical parts or workpieces are rotated about centers found at the ends thereof or supported on the periphery of the workpiece. Cylindrical parts which are relatively soft, having a hardness of Rockwell "C" scale ($R_c$) of 40 or less and which have medium tolerance requirements, for example ±0.002 inches in diameter tolerance, are typically turned on a turning machine with a cutting tool.

A lathe, for example, a numerically controlled lathe, is typically used to manufacture this type. of workpiece. The workpiece may be rotated about its centers by pressing in with centers on the lathe or, preferably, a portion of the outer periphery of the workpiece is clamped to provide sufficient torque required for the turning process.

More accurate or precision machining, i.e. for parts requiring a tolerance of less than +0.002 inches and/or for grinding materials having a hardness greater than, for example, 40 $R_c$ is typically performed on a grinding machine utilizing a grinding wheel. Grinding of precision workpieces is accomplished by rotating the workpiece simultaneously with rotating a cylindrical grinding wheel in contact with the outer periphery of the workpiece. The workpiece is typically rotated about centers found at the end of the workpiece on a machine called a center-type grinder or may be supported on the periphery of the workpiece by a regulating wheel and a rest blade. Such peripheral support for a workpiece is performed on centerless-type grinders.

Long slender shafts requiring precision surfaces that may require a turning or a grinding to be performed thereon are used extensively in machines that pass a substrate through the machine. The long slender shafts are utilized to guide and direct the paper substrate through the machine and/or for performing operations on the substrate. For example, copying machines and printing machines have large substrates in the form typically of paper. The substrate may be in the form of a roll of paper or in the form of cut sheets.

Long shafts and, in particular, long, slender shafts such as those made from durable materials such as steel, deflect under the grinding or cutting of the workpiece. The deflection of the shafts affects the quality of the shafts and the precision requirements required for such shafts may be very difficult to obtain.

Attempts have been made to improve the quality of long thin shafts, which are turned or ground by reducing the deflection of the shaft during machining. The most common tool utilized in reducing the deflection of long thin workpieces is a work support or steady rest. The part deflection due to the force of the grinding wheel or cutting tool or simply due to the mass or weight of the workpiece is counteracted by the support from the steady rest. A further function of the steady rest is to prevent workpiece vibration and thereby to eliminate or reduce chatter.

An understanding of the use of steady rest is more thoroughly described in *Modern Grinding Technology* by Salmon, the relevant portions thereof incorporated herein by reference.

Referring now to FIG. 8, a prior art mechanically contacting steady rest is shown in FIG. 8. The standard steady rest is typically a 2 or 3 point contact tool that holds the part rigidly in place. For example, the steady rest 1 includes three fingers 2 which include contact points 3 which are equally spaced about roll 4. The fingers 3 are in contact with periphery 5 of the roll 4 and serve to support the roll 4 as it rotates about longitudinal axis 6. The work support 1 is secured to machine base 7.

In the well-known process of electrophotographic printing, a charge retentive surface, typically known as a photoreceptor, is electrostatically charged, and then exposed to a light pattern of an original image to selectively discharge the surface in accordance therewith. The resulting pattern of charged and discharged areas on the photoreceptor form an electrostatic charge pattern, known as a latent image, conforming to the original image. The latent image is developed by contacting it with a finely divided electrostatically attractable powder known as "toner." Toner is held on the image areas by the electrostatic charge on the photoreceptor surface.

Thus, a toner image is produced in conformity with a light image of the original being reproduced. The toner image may then be transferred to a substrate or support member (e.g., paper), and the image affixed thereto to form a permanent record of the image to be reproduced. Subsequent to development, excess toner left on the charge retentive surface is cleaned from the surface. The process is useful for light lens copying from an original or printing electronically generated or stored originals such as with a raster output scanner (ROS), where a charged surface may be imagewise discharged in a variety of ways.

While shafts in electrophotographic printing for guiding substrates require accurate tolerances and may be long and slender, exasperating the accurate tolerance problems, the difficulties encountered in providing accurate donor rolls for scavengeless development systems is particularly acute.

In a scavengeless development system, toner is detached from the donor roll by applying AC electric field to self-spaced electrode structures, commonly in the form of wires positioned in the nip between a donor roll and photoreceptor in the case of hybrid scavengeless development or by applying the AC electrical field directly to the donor roll in the case of hybrid jumping development. This forms a toner powder cloud in the nip and the latent image attracts toner from the powder cloud thereto. Because there is no physical contact between the development apparatus and the photoreceptor, scavengeless development is useful for devices in which different types of toner are supplied onto the same photoreceptor such as in "tri-level"; "recharge, expose and develop"; "highlight"; or "image on image" color xerography.

Since hybrid scavengeless development relies on a continuous, steady toner powder cloud at the nip between the latent image and the donor roller, the speeds at which the rollers operate are significantly higher and the accuracy requirements are much more precise.

The purpose and function of scavengeless development are described more fully in, for example, U.S. Pat. No. 4,868,600 to Hays et al., U.S. Pat. No. 4,984,019 to Folkins, U.S. Pat. No. 5,010,367 to Hays, or U.S. Pat. No. 5,063,875 to Folkins et al. U.S. Pat. No. 4,868,600 is incorporated herein by reference.

For proper operation of a donor roll in a hybrid scavengeless development, the diameter tolerance, runout and surface finish requirements of the donor roll are very critical and require very precise dimensions. Furthermore, donor rolls typically have a long length and a small diameter. For example, donor rolls may have a length of, for example, 18 to 24 inches and a diameter from 1 to 1½ inches. When machining donor rolls with such a length to diameter ratio of 20 to 1 or greater, the rolls tend to deflect during the machining process. To complicate the situation, donor rolls may be made of a hard ceramic material which is difficult to machine. Because of the high tolerances and hard material, the donor rolls are often ground rather than turned. The grinding forces are typically higher than turning forces, thus causing the deflection during machining to increase.

Attempts have been made to reduce the deflection of rolls during the machining process. For example, mechanical supports are fixedly positioned underneath the roll during the machining process. These types of supports come in two particular designs. The support may be in the form of a steady rest which is fixedly positioned with respect to the roll and in the form of a follower rest which is mounted to the machining tool slide and moves with the material removal tool.

Mechanically contacting steady rests and follower rests have several problems. Mechanical steady rests consist of three equally spaced contact points against the roll as it is machined. Since the contact points typically in the form of pads or rollers are fixedly set, the contact points must be set to, for example, the unmachined dimensions and during the machining the contact points separate from the now-machined dimensions permitting the roll to deflect slightly under the machining forces.

The mechanically contacting steady rests and follower rests must be readjusted for each particular roll size that is to be machined on the machine. The contact points must be adjusted to contact the workpiece so that any change in the part diameter of a workpiece requires a changeover to the mechanical work support or steady rest setup. Furthermore, the setups are very difficult because selecting the optimum work. support setting related a work piece which part size is changing during the machining process is a trial and error process.

Furthermore, the mechanical contact work support tends to be bulky and may interfere with the position in which in process gauge fingers should otherwise be placed.

Also, when utilizing a mechanical follower rest, the installation of gauge fingers at the follower rest is very difficult.

Addition problems occur when machining ceramic materials utilizing a mechanical work support. The ceramic material is hard and very abrasive. When a material that is very hard is utilized at the contact points of the work support, the work support tends to burnish or wear the outer surface of the ceramic roll. When used for donor rolls, the electrical properties of the outer surface of the ceramic roll are adversely affected by a burnishing process, particularly if foreign material from the work rest is embedded into the roll. Furthermore, the burnishing may affect the size and the finish of the ceramic material.

When, alternatively, a soft material is utilized to support the ceramic roll, the support tends to wear excessively and loses its effectiveness by no longer totally supporting the roll. Furthermore, if a soft material is used for the work support, the outer surface of the work support becomes embedded into the ceramic material, further deteriorating the electrical properties of the ceramic roll.

Furthermore, the use of a mechanical steady rest makes adjustments for the proper fitting of the steady rest particularly during the machining process very difficult.

When utilizing a steady rest, the setup of the steady rest is very difficult in that not only the fit of the steady rest to the workpiece needs to be adjusted, but also the position of the mechanical steady rest needs to be adjusted. A series of steady rests may in fact be required to adequately support the part. Furthermore, the steady rest only serves to reduce chatter when the tool is positioned opposed to the support.

The following disclosures may be relevant to various aspects of the present invention:

U.S. Pat. No. 5,527,210

Patentee: Sharer

Issue Date: Jun. 186, 1996

U.S. Pat. No. 5,285,599

Patentee: Lessway

Issue Date: Feb. 15, 1994

U.S. Pat. No. 4,831,782

Patentee: Clough, et al.

Issue Date: May 23, 1989

U.S. Pat. No. 4,715,149

Patentee: Kelsey

Issue Date: Dec. 29, 1987

U.S. Pat. No. 4,712,332

Patentee: Smith

Issue Date: Dec. 15, 1987

U.S. Pat. No. 4,711,054

Patentee: Tsujiuchi et al.

Issue Date: Dec. 8, 1987

U.S. Pat No. 4,663,892

Patentee: Smith

Issue Date: May 12, 1987

U.S. Pat. No. 4,546,681

Patentee: Owsen

Issue Date: Oct. 15, 1985

U.S. Pat. No. 4,399,639

Patentee: Lessway

Issue Date: Aug. 23, 1983

U.S. Pat. No. 4,276,723

Patentee: Fournier

Issue Date: Jul. 7, 1981

The relevant portions of the foregoing disclosures may be briefly summarized as follows:

U.S. Pat. No. 5,527,210 discloses a dynamic steady rest particularly adapted for use in supporting a rotating workpiece during a grinding operation. The steady rest includes a lever assembly pivotally mounted on a base and having a workpiece support arm and a counterweight arm. Weights are adjustably secured to the counterweight arm and bias the support arm upwardly and into supporting engagement with the rotating workpiece. The steady rest further includes two dashpots pivotally secured between the base and the support arm to dampen the motion of the support arm.

U.S. Pat. No. 5,285,599 discloses a centering and supporting apparatus is disclosed for use as a true centering steady rest for rotatably supporting a cylindrical workpiece during a machining or grinding operation. The apparatus has an internal centerline adjustment mechanism for adjusting the steady rest so as to support the workpiece at its dynamic working centerline. At least one, or a pair of support arms are slidably mounted on an operator body in a housing. The one or pair of support arms each carries a side workpiece contact member, and the operator body carries a center workpiece contact member, and each workpiece contact member is engagable with the perimeter of the workpiece. The operator body is moved by a stroking means to urge the center workpiece to support a workpiece. The support arms are urged to support the workpiece by the action of cam followers carried by the support arms, and which cam followers are each engaged with a camming contour disposed in a guide plate that is displaceable within the housing by the internal centerline adjustment mechanism. The internal centerline adjustment mechanism allows either one or a pair of guide plates to be shifted within the steady rest to accommodate any deviation which the dynamic working centerline imposes from the static centerline originally established prior to a machining or grinding operation.

U.S. Pat. No. 4,831,782 discloses an improved grinding apparatus includes a base upon which a headstock is mounted. A carriage is movable along ways disposed on the base. A wheel slide on the carriage rotatably supports a grinding wheel. A first mounting plate extends beneath a first footstock and a first set of steady rests to a location adjacent to a headstock. While a workpiece is being ground, a second set of steady rests and a second footstock are mounted on a second mounting plate. When the grinding operation has been completed, the first mounting plate is disconnected from the base and removed from the grinding apparatus with the first set of steady rests and footstock. The second mounting plate with the second set of steady rests and footstock accurately positioned thereon are then inserted into the grinding apparatus.

U.S. Pat. No. 4,715,149 discloses a flow valve seat grinding apparatus incorporating an improved steady rest means. Includes a tubular drive shaft housing which houses and supports a rotatable and longitudinally movable drive shaft means. Drive shaft is connected through a flexible torque coupler to drive a valve seat grinding head. Grinding head is adapted to grind a valve seat located within a valve body. Includes adjustable anchor operable to laterally extend at least three anchor members into fixed anchoring contact with a sidewall of a valve body to laterally support the shaft housing in fixed position within the valve body.

U.S. Pat. No. 4,712,332 discloses a centerless grinding system comprises a driven grinding wheel, a driven regulating wheel, and a work rest blade for centerless grinding of a workpiece supported by the work rest blade between the grinding wheel and the regulating wheel; means for determining the rate of reduction of the workpiece radius while it is being ground; and means responsive to the rate of reduction of the workpiece radius for controlling the ratio of the power consumed in removing workpiece material to the rate of removal of workpiece material by the grinding wheel. The regulating wheel is preferably fed toward the grinding wheel to feed the workpiece into the grinding wheel. In a similar center-type grinding system, the workpiece is mounted on spindles or chucks which are movable toward the grinding wheel so that the workpiece can still be fed by the regulating wheel. Workpieces longer than the axial dimension of the grinding wheel are ground in successive plunges along the length of the workpiece, with the depth being controlled in each successive plunge. To grind hollow workpieces, the regulating wheel or grinding wheel is placed inside the hollow workpiece.

U.S. Pat. No. 4,711,054 discloses in a numerical control grinding machine using a grinding wheel made of cubic boron nitride, a computerized numerical controller controls the infeed movement of a wheel head to effect a rough grinding and a first fine grinding on a rotating cylindrical workpiece by the grinding wheel and to halt the first fine grinding in response to a sizing signal from a sizing device which measures the diameter of the workpiece being ground. At the halt of the first fine grinding, the numerical controller advances rest jaws to press the workpiece upon the grinding wheel until another sizing signal is issued from the sizing device. Until the number of the workpieces ground after each truing operation reaches a predetermined number, the numerical controller increase the infeed rate of the grinding wheel in each of the rough and first fine grindings toward a desired infeed rate on a step-by-step basis. Further, the numerical controller diminishes a set size which determines the time point to issue the first-mentioned sizing signal from the sizing device, toward a desired set size on a step-by-step basis with the increases in number of the workpiece ground after each truing.

U.S. Pat. No. 4,663,892 discloses a method of grinding a workpiece which is susceptible to deflection and/or deformation when grinding is carried out by relatively infeeding a grinding wheel to keep the wheel face and work surface in relative rubbing contact at an interface region, the method comprising continuously determining the force exerted by the wheel on the workpiece at the interface region as grinding conditions change, continuously applying to the workpiece at least one counterbalance force which in equivalent effect is opposite in sense to the determined force, and variably controlling the counterbalancing force to maintain its effective magnitude equal to the magnitude of the determined force.

U.S. Pat. No. 4,546,681 discloses a steady rest for alternatively supporting the internal and external surfaces of a tubular workpiece during a machining operation. Each outer end of a plurality of movable fingers includes first and second workpiece contact devices such as rollers. The second contact device is offset from the longitudinal axis of the finger so that it may engage the inner periphery of the workpiece. The opposite inner ends of the outer fingers ride in slots having opposing arcuate cam surfaces. One cam surface provides backup support for its finger when externally contacting the workpiece while the other cam surface insures stability when its finger is contacting the inner periphery of the workpiece.

U.S. Pat. No. 4,399,639 discloses a true centering steady rest for rotatably supporting an elongated cylindrical workpiece for a metal working operation on the outer diameter of the workpiece, such as a grinding operation. The steady rest includes a housing in which is slidably mounted a pusher arm carrying a workpiece center wear pad. A pair of side arms is slidably mounted on said pusher arm. Each side arm carries a replaceable wear pad engageable with a workpiece at a point in the range from 90°–140° from the center wear pad. The center and side wear pads are moved into operative engagement with a workpiece when the pusher arm is moved toward the workpiece, and they are disengaged from the workpiece when the pusher arm is moved away from the workpiece.

U.S. Pat. No. 4,276,723 discloses a steady rest for supporting a workpiece to be ground comprising three contact shoes which are simultaneously movable toward and away from a workpiece centerline so that workpieces of varying diameter can be supported and maintained on a fixed centerline of rotation. The top contact shoe is mounted for pivotal movement to a position clear of the work area to facilitate loading and unloading of the workpiece. A hydraulic operator is provided for pivoting the upper contact shoe between the operative position, engaging a workpiece, and the loadunload position. A second hydraulic operator is provided which through appropriate mechanical wedges moves upper contact shoe and the two lower non-pivoting contact shoes simultaneously toward or away from a workpiece.

SUMMARY OF THE INVENTION

According to the present invention, there is provided a support for supporting a work piece to be machined. The support is for use in a machine adapted to receive fluid from a fluid source. The machine includes a tool for removing material from the work piece. The support includes a body defining a chamber therein and an inlet operably associated with the body. The inlet is in communication with the chamber. The inlet is adapted for communication with the fluid source. The support also includes an outlet operably associated with the body and in communication with the chamber. The outlet is adapted to provide a stream of fluid for supporting the work piece.

According to the present invention there is further provided a method for machining the cylindrical periphery of cylindrical work pieces. The method includes the steps of providing a machine for removing material from a work piece, placing the work piece in operating position within the machine, placing a support in a spaced apart relationship to the work piece, providing a fluid source in fluid communication with a fluid flow device, advancing the fluid within the fluid source with the fluid flow device toward the support, advancing the tool toward the work piece, flowing fluid from the support onto the work piece, machining material from the work piece with the tool, and providing a fluid force from the fluid flowing onto the work piece to oppose a tool force from the tool so that the deflection of the work piece by the tool is reduced.

According to the present invention there is further provided a roll made by the process of providing a machine for removing material from a work piece, placing the work piece in operating position within the machine, placing a support in a spaced apart relationship to the work piece, providing a fluid source in fluid communication with a fluid flow device, advancing the fluid within the fluid source with the fluid flow device toward the support, advancing the tool toward the work piece, flowing fluid from the support onto the work piece, machining material from the work piece with the tool, and providing a fluid force from the fluid flowing onto the work piece to oppose a tool force from the tool so that the deflection of the work piece by the tool is reduced.

According to the present invention there is further provided a grinding machine for use in grinding a work piece. The grinding machine includes a frame and a grinding wheel rotatably mounted to the body. The grinding machine further includes a motor for rotating the grinding wheel and an apparatus operably associated with the body for rotatably supporting the work piece in a spaced apart relationship with respect to the apparatus.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Inasmuch as the art of electrophotographic printing is well known, the various processing stations employed in the FIG. 9 printing machine will be shown hereinafter schematically and their operation described briefly with reference thereto.

Figure 9:
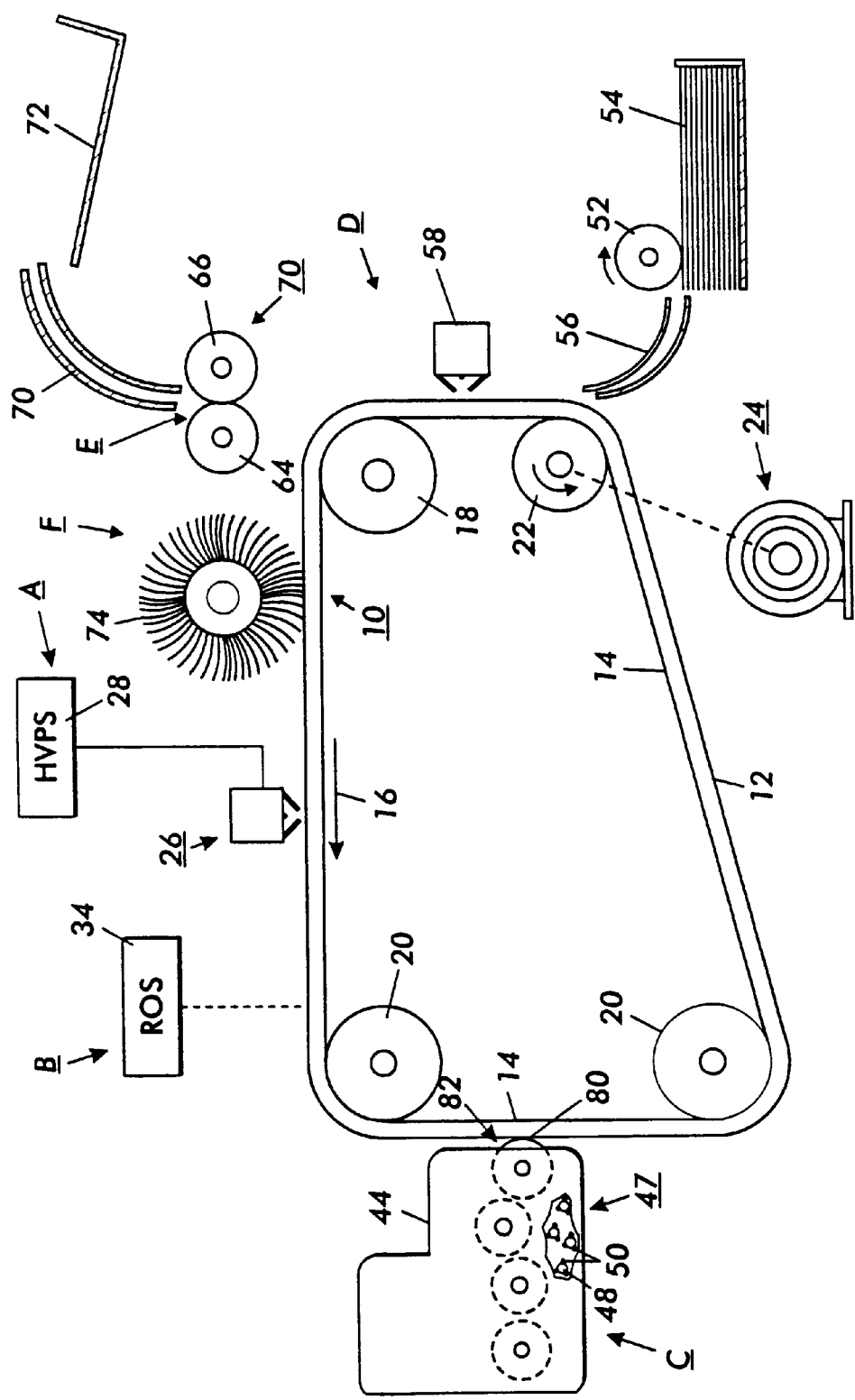
FIG. 9 is a schematic elevational view of an illustrative electrophotographic printing machine incorporating a roll ground on a grinding machine utilizing the non-contact support of the present invention therein.

Referring initially to FIG. 9, there is shown an illustrative electrophotographic printing machine incorporating a roll machined utilizing the non-contact support of the present invention of the present invention therein. The printing machine incorporates a photoreceptor 10 in the form of a belt having a photoconductive surface layer 12 on an electroconductive substrate 14. Preferably, the surface 12 is made from a selenium alloy or a suitable photosensitive organic compound. The substrate 14 is preferably made from a polyester film such as Mylar® (a trademark of duPont (UK) Ltd.) which has been coated with a thin layer of aluminum alloy which is electrically grounded. The belt is driven by means of motor 24 along a path defined by rollers 18, 20 and 22, the direction of movement being counter-clockwise as viewed and as shown by arrow 16. Initially a portion of the belt 10 passes through a charge station A at which a corona generator 26 charges surface 12 to a relatively high, substantially uniform, electrical potential. A high voltage power supply 28 is coupled to device 26.

Next, the charged portion of photoconductive surface 12 is advanced through exposure station B. At exposure station B, the ROS 34 lays out the image in a series of horizontal scan lines with each line having a specified number of pixels per inch. The ROS includes a laser and a rotating polygon mirror block associated therewith. The ROS exposes the charged photoconductive surface of the printer.

Figure 4:
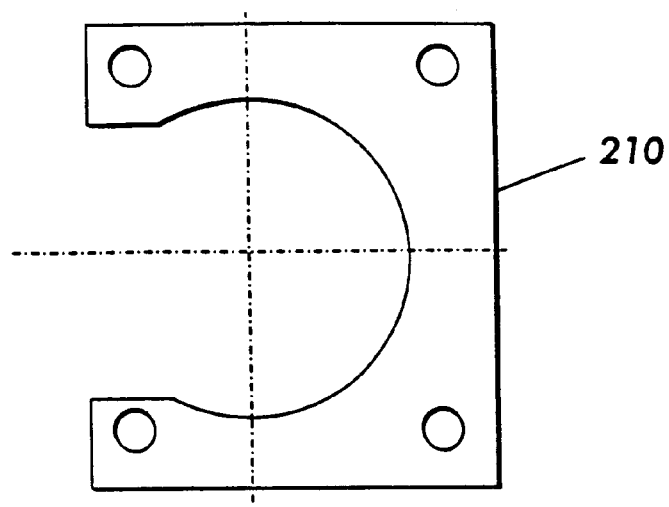
FIG. 4 is a plan view of a side plate for the support of FIG. 1.

After the electrostatic latent image has been recorded on photoconductive surface 12, the motion of the belt 10 advances the latent image to development station C as shown in FIG. 4. At development station C, a development system 38, develops the latent image recorded on the photoconductive surface. The chamber in developer housing 44 stores a supply of developer material 47. The developer material 47 may be, as shown in FIG. 4, a two component developer material of at least magnetic carrier granules 48 having toner particles 50 adhering triboelectrically thereto. It should be appreciated that the developer material may likewise comprise a one component developer material consisting primarily of toner particles. Preferably the development system is a hybrid scavangeless development system. In a scavengeless development system, toner is detached from a donor roll by applying AC electric field to self-spaced electrode structures (not shown), commonly in the form of wires positioned in the nip between the donor roll 80 and the photoreceptor belt 10 in the case of hybrid scavengeless development or by applying the AC electrical field directly to the donor roll 80 in the case of hybrid jumping development. This forms a toner powder cloud in the nip and the latent image attracts toner particles 50 from the powder cloud thereto.

Again referring to FIG. 9, after the electrostatic latent image has been developed, the motion of the belt 10 advances the developed image to transfer station D, at which. a copy sheet 54 is advanced by roll 52 and guides 56 into contact with the developed image. on belt 10. A corona generator 58 is used to spray ions on to the back of the sheet so as to attract the toner image from belt 10 to the sheet. As the belt turns around roller 18, the sheet is stripped therefrom with the toner image thereon.

After transfer, the sheet is advanced by a conveyor (not shown) to fusing station E. Fusing station E includes a heated fuser roller 64 and a back-up roller 66. The sheet passes between fuser roller 64 and back-up roller 66 with the toner powder image contacting fuser roller 64. In this way, the toner powder image is permanently affixed to the sheet. After fusing, the sheet advances through chute 70 to catch tray 72 for subsequent removal from the printing machine by the operator.

After the sheet is separated from photoconductive surface 12 of belt 10, the residual developer material adhering to photoconductive surface 12 is removed therefrom at cleaning station F by a rotatably mounted fibrous brush 74 in contact with photoconductive surface 12. Subsequent to cleaning, a discharge lamp (not shown) floods photoconductive surface 12 with light to dissipate any residual electrostatic charge remaining thereon prior to the charging thereof for the next successive imaging cycle.

It is believed that the foregoing description is sufficient for purposes of the present application to illustrate the general operation of an electrophotographic printing machine incorporating the development apparatus of the present invention therein.

According to present invention and referring again to FIG. 9. the donor roll 80 which is ground on a grinding machine utilizing the non-contact support of the present invention is shown. The donor roll 80 is electrically biased to separate toner particles 50 from the carrier granules 48 of the developer material within the developer housing 44. The donor roll 80 is electrically biased and in cooperation with the developmental electrodes (not shown) serves to form a powder cloud in nip 82 between the donor roll 80 and the surface 12 of the photoconductive valve 10. The donor roll 80 is made to exacting tolerances and may be made of a material difficult to machine, for example, a ceramic material. It should be appreciated that while the donor roll 80 is a exemplary workpiece to be machined utilizing the non-contact support of the present invention, any workpiece which deflects during the machining process may benefit from the use of the present invention herein.

Figure 1:
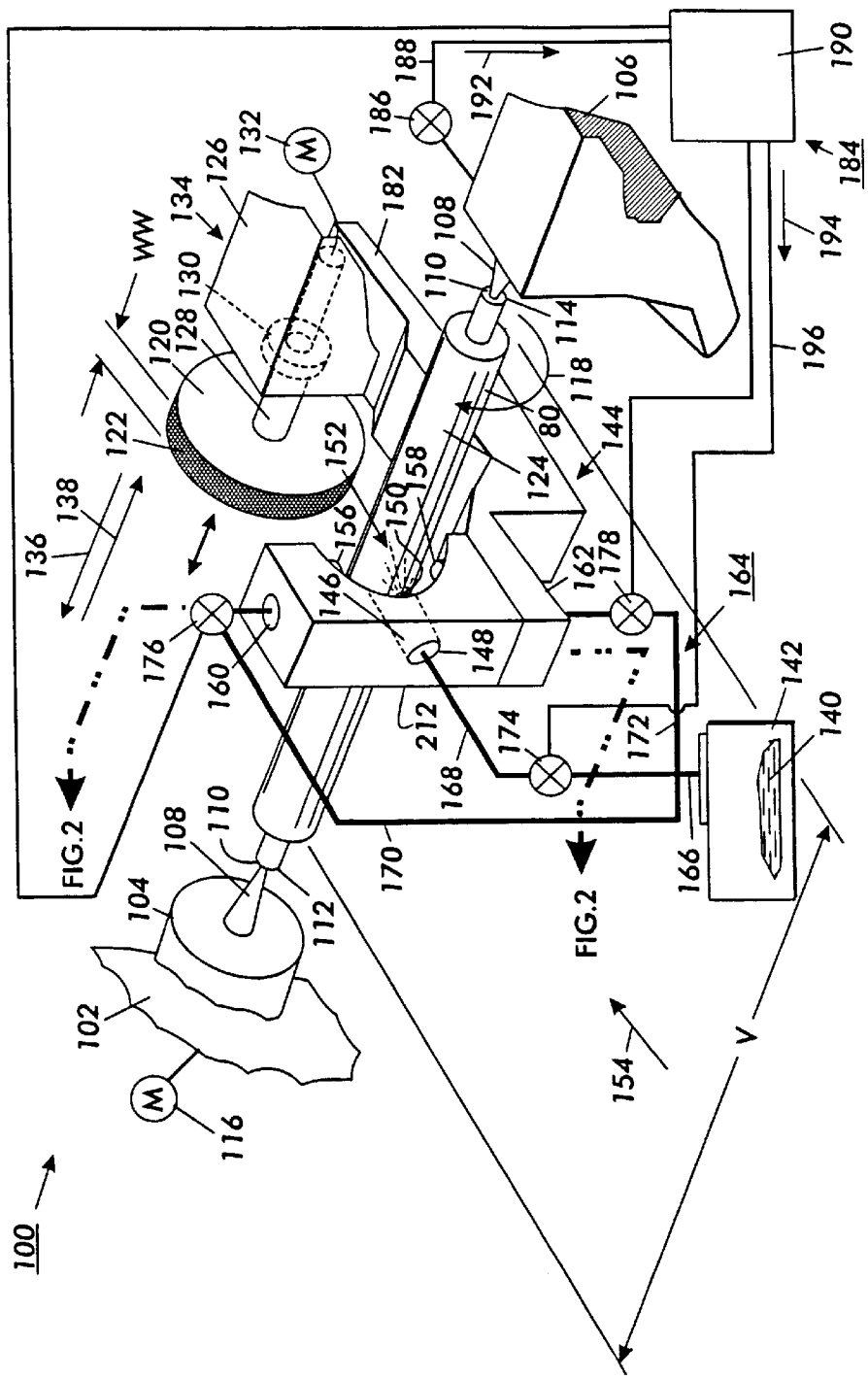
FIG. 1 is a perspective schematic partial view of a non-contact support installed on a grinding machine for cylindrical grinding according to the present invention.

Referring now to FIG. 1, support 100 according to the present invention, is shown installed in machine 102. The machine 102 may be any machine tool capable of removing material from a cylindrical workpiece. Typically the machine 102 is in the form of a lathe, for example, a CNC lathe, or in the form of a grinding machine. As shown in FIG. 1, the machine 102 is a grinding machine. When the machine 102 is a grinding machine, it may be either a center-type or a centerless grinder. As shown in FIG. 1, the machine 102 is a center-type grinder.

The support 100 is utilized to support a workpiece, for example, roll 80.

The roll 80 is supported in the grinding machine 102 by a headstock 104 and a tailstock 106. Centers 108 extend outwardly from the headstock 104 and the tailstock 106 and engage with chamfers 110 located on first end 112 and second end 114 of the workpiece 80. A headstock motor 116 is used to rotate the headstock 104, which in turn rotates the workpiece 80 in the direction of arrow 118.

The machine 102 includes a tool 120 for removing material from the roll 80. As shown in FIG. 1, the tool 120 is in the form of a grinding wheel. As shown in FIG. 1, the grinding wheel 120 has a generally cylindrical shape and includes an outer periphery 122, which contacts outer periphery 124 of the roll 80. It should be appreciated, however, that the tool 120 may be any tool capable of removing material from a workpiece. For example, the tool 120 may be in the form of a high speed steel or carbide cutting tool.

The grinding wheel 120 is preferably mounted to a wheelhead 126 by an arbor 128 secured to the wheel 120. The arbor 128 rotates about bearings 130 located in the wheelhead 126. The arbor 128 is rotated by a wheelhead motor 132 connected to the wheelhead 126. The wheelhead 126 is adapted to move in the direction of arrow 134 thereby advancing the grinding wheel 120 into contact with periphery 124 of the roll 80.

While the tool 120 may have a wheel width WW that is similar to the length L of the roll 80, preferably, the tool 120 has a width WW which is significantly less than the length L of the roll 80. Since the width of the wheel 120 is less than the length of the workpiece 80, the wheelhead 126 preferably moves in the direction of arrows 136 and 138.

According to the present invention, the support 100 is adapted for use in the machine 102 and is adapted to received fluid 140 from a fluid source 142. The support 100 may have any suitable shape and configuration capable of transmitting the fluid 120 toward the periphery 124 of the roll 182 support the roll 80. The support 100 includes a body 144 that defines a chamber 146 within the body 144. The support 100 further includes an inlet 148 that is operably associated with the body 144. The inlet 148 is in communication with the chamber 146. The inlet 148 is adapted for communication with the fluid source 142. The support 100 also includes an outlet 150. The outlet 150 is operably associated with the body 144 and is in communication with the chamber 146. The outlet 150 is adapted to provide a stream 152 of fluid 140 for supporting the workpiece or roll 80. Stream 152 of fluid 140 from the outlet 150 provides a force in the direction of arrow 154 in a direction opposed to a force in the direction of arrow 134 caused by the grinding of the roll 80 by the tool 120.

While the invention may be practiced with a support 100 including only a solitary outlet providing a stream in the direction of arrow 154, preferably, the support 100 includes additional outlets to assist in stabilizing the roll 80 and to provide additional coolant to the grinding of the roll by the grinding wheel 120. For example, as shown in FIG. 1, the support 100 may further include, in addition to first outlet 150, a second outlet 156 positioned vertically above the roll 80, as well as a third outlet 158 positioned vertically below the roll 80.

While it should be appreciated that the first outlet 150, the second outlet 156, and the third outlet 158 may all be interconnected by, for example, the chamber 146 to inlet 148, preferably, each of the first outlet 150, the second outlet 156, and the third outlet 158 are each associated with a separate inlet. For example, the first outlet 150 is operably connected to first inlet 148. Second outlet 156 is similarly operably connected to second inlet 160 and third outlet 158 is operably connected to third inlet 162.

The fluid 140 utilized in the support 100 of the present invention, may be any fluid either in the form of a liquid or a gas that provides a noncontact support to the workpiece 80. For example, the fluid 140 may be a liquid, for example water or oil, or may be in the form of a gas, for example a compressed gas or compressed air. For simplicity, the fluid 140 may be in the form of a coolant utilized to cool the grinding wheel 120. For example, the fluid 140 may be a cutting oil or a water based grinding wheel coolant. Typically, the fluid 140 is in the form of a water based grinding wheel coolant.

The fluid 140 may be delivered to the support 140 through a series of conduits 164. The conduits 164 may include a main conduit 166 that is connected to the fluid source 142. The main conduit 164 is, as shown in FIG. 1, also connected to first conduit 168, second conduit 170 and third conduit 172.

The fluid source 142 may be any suitable fluid source capable of providing a fluid flow to the support 100. Typically the fluid source 142 is in the form of a fluid pump, for example a coolant pump. For simplicity, the coolant pump 142 may be the coolant pump that is utilized with the machine 102 for cooling the tool 120 and the workpiece 80.

The coolant pump 142 may be of any configuration capable of providing sufficient fluid flow for the operation of the support 100 according to the present invention. Applicants have found that a coolant pump capable of delivering 60 gallons per minute of coolant flow is sufficient for providing support for the donor roll 80 as show in FIG. 9.

Preferably, to balance the force of the flow from the fluid source through the support 100 with the grinding wheel force from the grinding wheel 120 upon the roll.80, preferably, the flow of fluid from the fluid source 142 is preferably controlled by a valve 174 in fluid communication with the inlet 148 for controlling the flow of fluid through the outlet 150. While a solitary first valve 174 may be sufficient to control the flow of fluid from the fluid source 142 to the support 100, preferably, as shown in FIG. 1, when utilizing a plurality of conduits and associated outlets, the support 100 utilizes, in addition to first valve 174, a second valve 176 positioned in second conduit 170 and a third valve 178 positioned in third conduit 172. By providing the first valve 174, the second valve 176 and the third valve 178, the flow from the first outlet 150 as well as the second outlet 156 and the third outlet 158 can be independently adjusted to provide for optimum support of the roll 80.

The body 144 of the support 100 is mounted to the machine 102 by any suitable method. The body 144 may be mounted to frame 180 of the machine 102 to which the headstock 104 and tailstock 106 are mounted or, preferably, as shown in FIG. 1, the body 144 of the support 100 is fixedly mounted to wheelhead 126 by support bracket 182.

As shown in FIG. 1, since the body 144 of the support 100 is fixed to the wheelhead 126, the support 100 moves with the grinding wheel 120 in the directions of arrows 136 and 138. Thus the support 100 provides support for the roll 80 at a position opposed to the grinding wheel 120 throughout the grinding process.

Alternatively, to further balance the support provided by the fluid source 142 with the grinding force from the grinding wheel 120, the support 100 may further include a feedback system 184. The feedback system 184 is utilized to provide a closed loop control of the fluid flow provided by the fluid source 142. The feedback system 184 includes a sensor 186 operably associated with the machine 102 which, for example, measures the force applied by the grinding wheel 120 onto the roll 80 as, for example, felt at the tailstock 106. The feedback system 184 further includes a feedback system controller 190, which is operably associated with the support 100. The feedback system controller 190 receives a signal 192 through conduit 188 from the sensor 186, which is indicative of the force supplied by the grinding wheel 120 onto the roll 80. The controller 190 sends a signal 194 through conduit 196 to the first valve 174 indicative of the flow of fluid through the first outlet 150 necessary to counteract the force applied by the grinding wheel 120 onto the roll 80.

Figure 2:
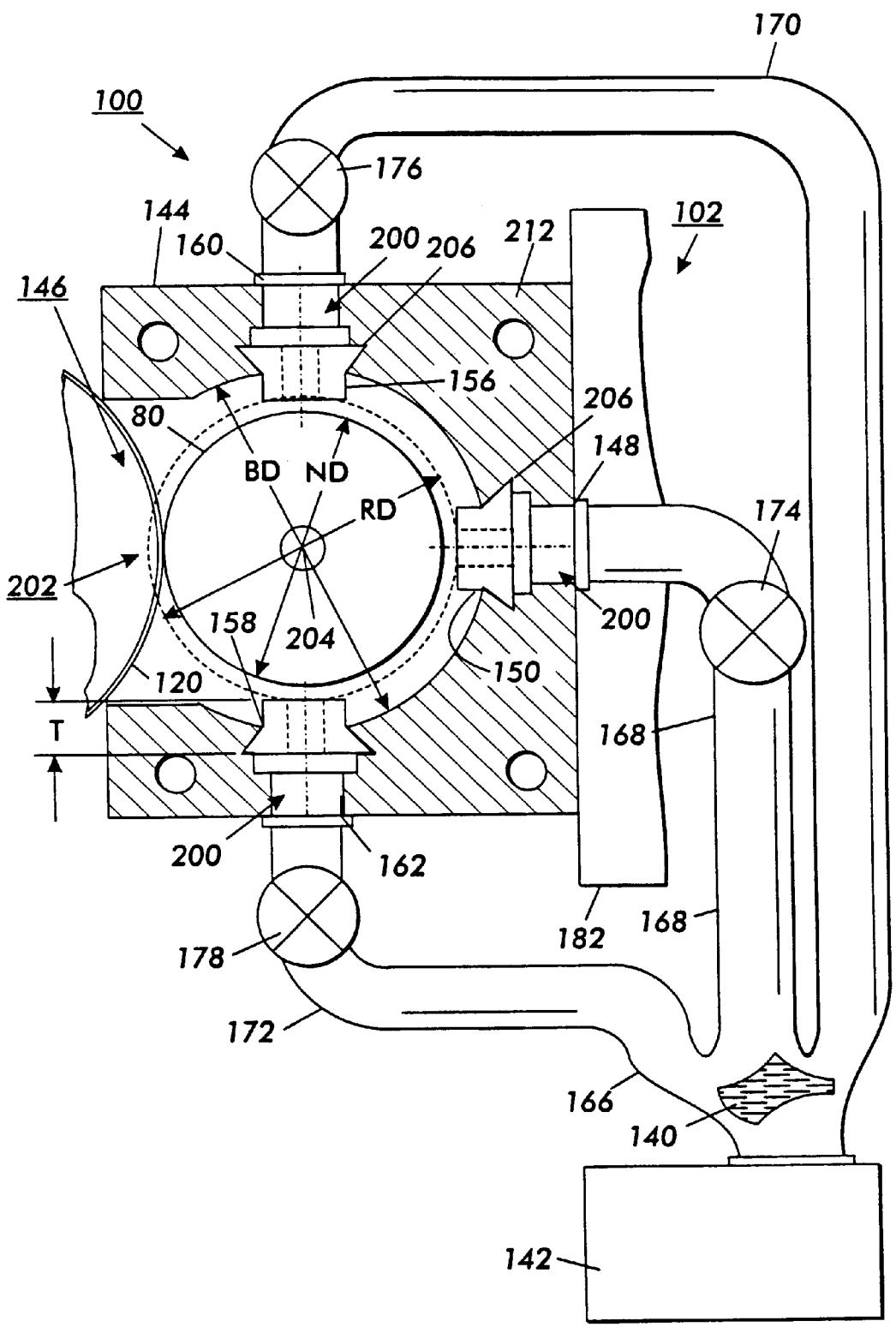
FIG. 2 is a sectional view along the line 6—6 in the direction of the arrows of the support of FIG. 1.

Referring now to FIG. 2, the support 100 is shown in greater detail. As shown in FIG. 2, the body 144 includes three apertures 200 in the body 144 as well as opening 202 that form the chamber 146.

While the inlets and outlets associated with the body 144 may have any suitable form, preferably as shown in FIG. 2, the inlets 148, 160, and 162 are integral with the body 144 and are defined by the apertures 200. The conduits 168, 170, and 172 may be secured to the body 144 in any suitable fashion, for example by pipe threads (not shown).

The outlets 150, 156 and 158 may have any suitable form and may, for example, be integral with the body 144 or as shown in FIG. 2, be in the form of nozzles. As shown in FIG. 2, the nozzles 150, 156 and 158 are preferably slidably fitted to the body 144 in a direction parallel with the longitudinal axis 204 of the roll 80. As shown in FIG. 2, the nozzles 150, 156 and 158 are secured to the body 144 by gibs 206 located on the outer periphery of the nozzles 150, 156 and 158, respectively.

Figure 3:
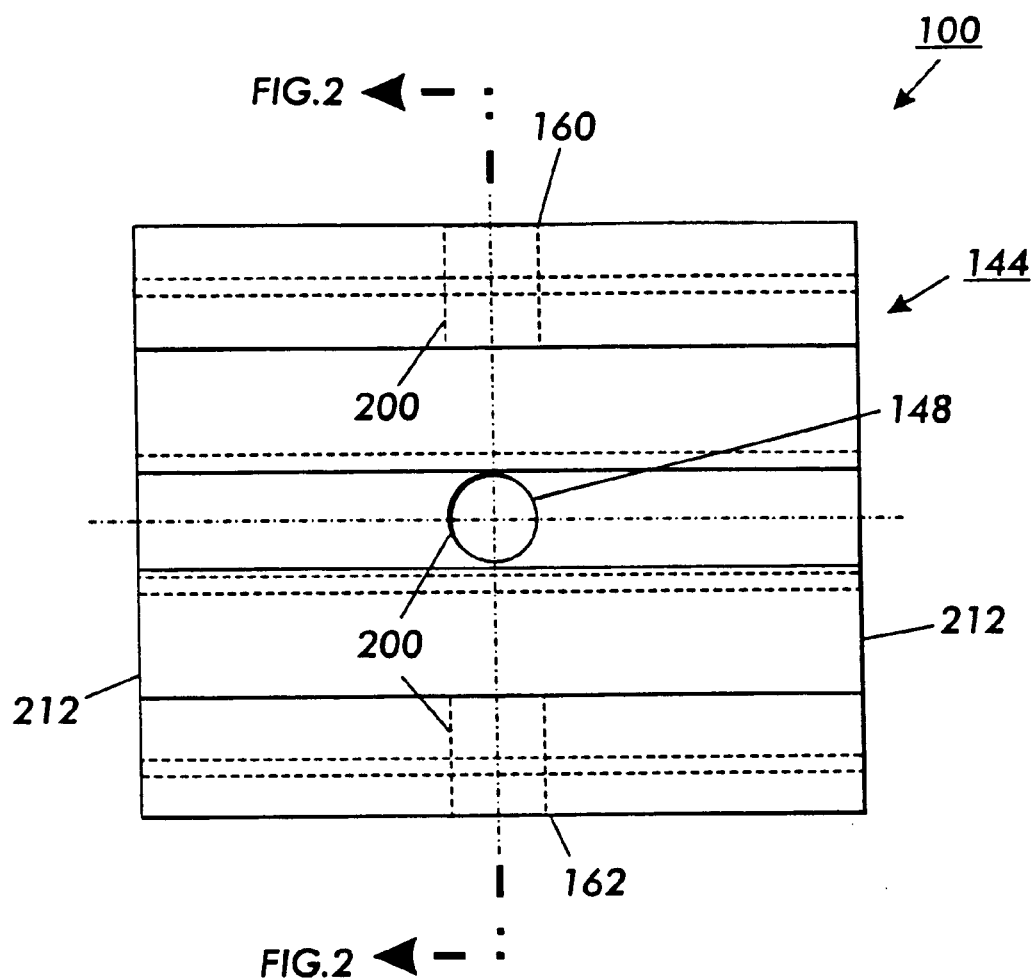
FIG. 3 is a plan view of the body of the FIG. 1 support.

Referring now to FIG. 3, the body 144 of the support 100 includes the centrally located inlets 148, 160 and 162. Apertures 200 within the body 144 define the inlets 148, 160 and 162.

Referring again to FIG. 2, the body 144, preferably closely conforms with the roll 80 so as to assure that sufficient fluid remains in communication with the roll during the machining of the roll. The opening 202 formed in the body 144 thus preferably is defined by a body diameter BD which is concentric with axis 204 of the roll 80. For example, for a roll having a roll diameter RD of, for example 1.2 inches, the body diameter BD is, for example 1.4 inches. By utilizing nozzles 150,. 156 and 158 that are slidably insertable into the body 144, replaceable nozzles may be utilized for different diameter rolls. It should be appreciated that the body diameter BD becomes increasingly larger than the roll diameter RD, roll diameters of smaller and larger size than the roll 80 may be accommodated by merely changing the thickness T of the outlets 150, 156 and 158.

To provide optimum force for a minimum flow of fluid through the support 100, preferably, the nozzles 150, 156 and 158 are positioned closely to the roll 80. For example, the nozzles 150, 156 and 158 form a nozzle diameter ND that is only slightly larger than the roll diameter RD. For example, for a roll diameter RD of 1.2 inches the nozzle diameter ND is approximately 1.3 inches.

Figure 6:
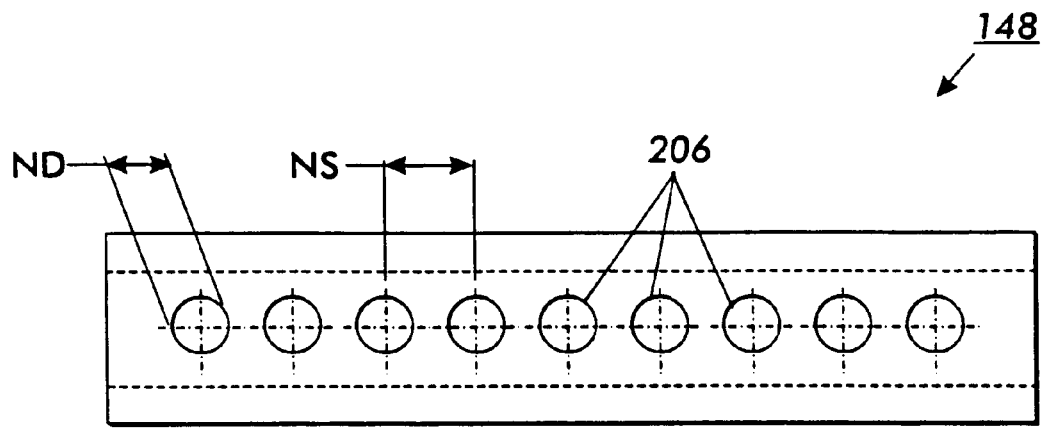
FIG. 6 is a plan view of a nozzle for the support of FIG. 1.
Figure 7:
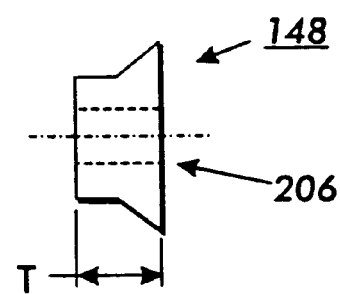
FIG. 7 is an end view of the FIG. 8 nozzle.
Figure 8:
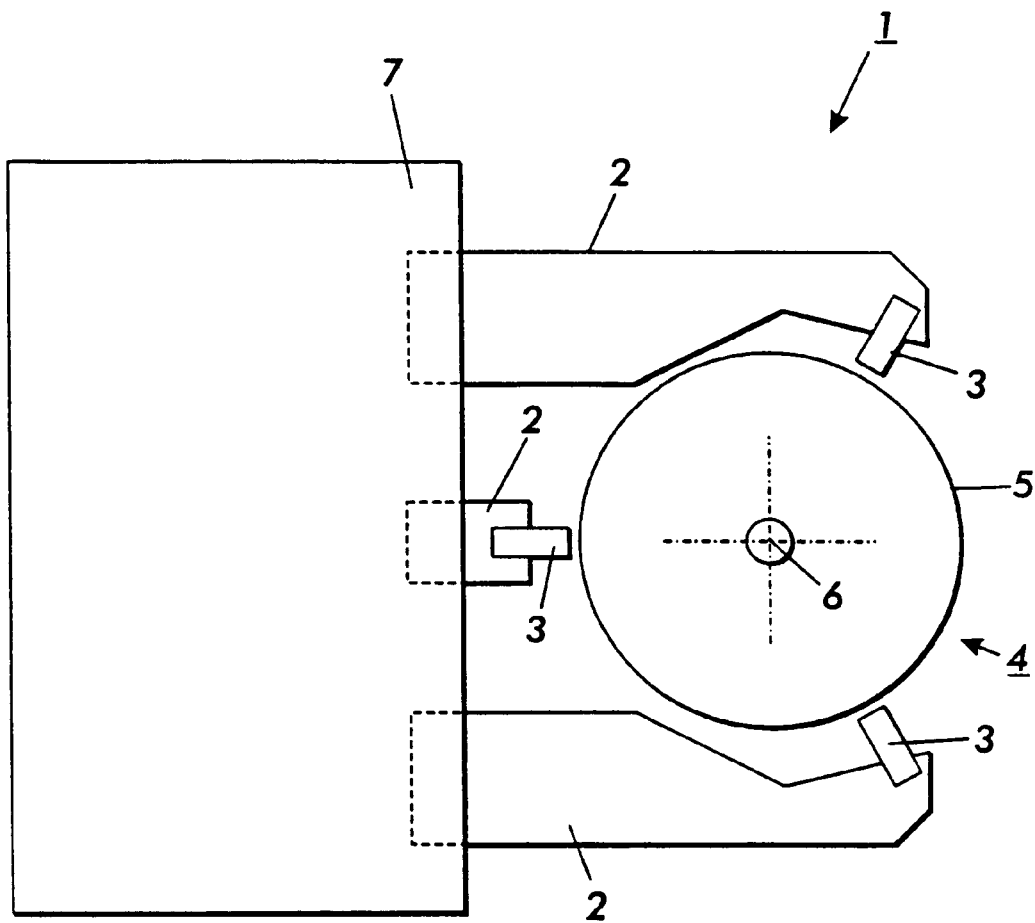
FIG. 8 is a schematic partial view of a prior art support installed on a grinding machine.

Referring now to FIGS. 6 and 7, nozzle 148 is shown in greater detail. While nozzles 148, 156 and 158 may each be different from the other, preferably, for simplicity, the nozzles 156 and 158 are preferably identical to nozzle 148. (See FIG. 2). While the invention may be practiced utilizing a support 100 with nozzles having a solitary aperture associated with each nozzle, preferably, the nozzle 148 includes a plurality of nozzle apertures 206.

By utilizing a plurality of apertures 206, the nozzle 148 may for a given flow rate be positioned more closely to the roll 80 thereby increasing the force that the fluid applies to the roll 80. Further, by reducing the size of the apertures 206, the velocity of the fluid through the nozzle 148 may be increased thereby increasing the force of the nozzle 148.

While the invention may be practiced with any number of apertures 206, applicants have found that a quantity of nine apertures per nozzle is sufficient for the operation. To support a ceramic roll 80 during the grinding thereof, applicants have found that apertures 206 with a diameter AD of, for example 3.175 millimeters spaced approximately a distance NS of approximately 5 millimeters, to be sufficient to support the roll 80.

Figure 5:
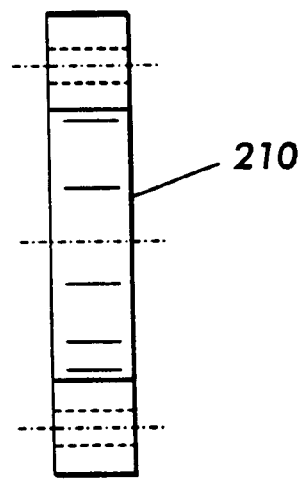
FIG. 5 is an end view of the FIG. 6 side plate.

Referring now to FIGS. 4 and 5, an endplate 210 is shown for restraining the sliding motion of the nozzles 148, 156 and 158. While it should be appreciated that the nozzles 148, 156 and 158 may be secured to the body 144 in any suitable fashion, for example, by gluing or interference fitting, for simplicity and for ease of changing the nozzles an endplate 210 is positioned on each of the two faces 212 of the body 144 (see FIG. 3).

The force provided by a flow of fluid against the roll may be described utilizing Newton's Second Law as described in the following equation:

$$F = p \times Q \times \Delta V$$

where:
P=density of water
Q=volume flow rate, and
$\Delta V$=the change in velocity of the fluid as it strikes the roll.
Q may be further defined by the following formula:

$$Q = a \times V$$

where:
a=cross sectional area of the nozzle aperture
V=the velocity of the fluid
a may be further defined by the following formula:

$$a = \Pi D^2 / 4$$

Where:
D=diameter of the nozzle

By utilizing the above equations, it can readily be seen that the force required to overcome the grinding force may be accomplished by utilizing a fluid with a sufficient flow rate.

By providing a fluid supporting non-contact work support burnishing marks on the workpiece are eliminated.

By providing a non-contact fluid steady rest, the possibility of embedding material into the workpiece during support is eliminated.

By providing a non-contact work support that moves with the grinding wheel, the work support force is applied only where needed.

By providing a non-contact fluid work support, setup time for the changeovers for one workpiece to a different workpiece is reduced.

By providing a non-contact work support that closely conforms with the grinding wheel, improved cooling of the grinding wheel is accomplished.

By providing for a non-contact work support, room is available at the tool for use of an in-process gauge.

By providing a non-contact fluid work support, the workpiece is better supported providing for deeper cuts and faster feeds which results in reduced machining times.

By providing for a fluid work support with removable nozzles, a variety of workpieces can be supported with a common non-contact work support.

By providing a non-contact work support with a feedback control system for optimizing the fluid flow upon the workpiece, deflection and chatter from the machining process may be reduced.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

We claim:

1. A method for machining the cylindrical periphery of cylindrical work pieces, comprising the steps of:

providing a machine for removing material from a work piece;

placing the work piece in operating position within the machine;

placing a support in a spaced apart relationship to the work piece;

providing a fluid source in fluid communication with a fluid flow device;

advancing the fluid within the fluid source with the fluid flow device toward the support;

advancing a tool toward the workpiece;

flowing fluid from the support onto the workpiece;

machining material from the workpiece with the tool;

providing a fluid force from the fluid flowing onto the work piece to oppose a tool force from the tool so that the deflection of the work piece by the tool is reduced wherein the fluid force is adjustable to counteract the force applied to the workpiece by the tool.

2. The method according to claim 1, further comprising the step of controlling the flow of fluid through an outlet with a valve.

3. The method according to claim 2, further comprising the steps of:

measuring the force applied by the tool onto the work piece with a sensor; and controlling the flow of fluid through the outlet by receiving a signal from the sensor indicative of the force applied by the tool onto the work piece and by sending a signal to the valve indicative of the flow of fluid through the outlet necessary to counteract the force applied by the tool onto the work piece.

* * * * *